United States Patent Office 3,470,178
Patented Sept. 30, 1969

3,470,178
ANTHRAQUINONE DYESTUFFS
Rütger Neeff and Wilhelm Gohrbandt, Leverkusen, and Robert Kuth, Cologne, Muengersdorf, Germany, assignors to Farbenfabriken Bayer Aktiengesellschaft, Leverkusen, Germany, a corporation of Germany
No Drawing. Filed Nov. 30, 1965, Ser. No. 510,693
Claims priority, application Germany, Dec. 2, 1964, F 44,593
Int. Cl. C07d 55/44; C09b 5/44; D06p 1/00
U.S. Cl. 260—249        5 Claims

ABSTRACT OF THE DISCLOSURE

Dyestuffs for dyeing or printing synthetic fiber materials which comprise triazine dyestuffs of the anthraquinone series wherein the triazine ring contains bis-alkoxyethoxy substituents.

---

The present invention is concerned with new anthraquinone dyestuffs and with the preparation thereof.

The new dyestuffs of the present invention, which yield valuable dyeings and prints on synthetic fibre materials, are compounds of the general formula:

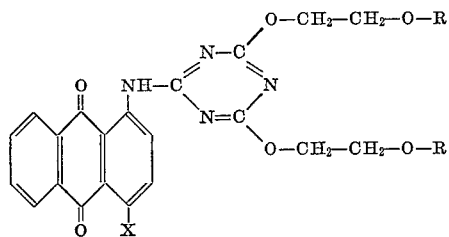

wherein X is a hydrogen atom or a hydoxyl group and R is a methyl or ethyl radical.

The new dyestuffs according to the present invention may, for example, to be obtained by reacting compounds of the general formula:

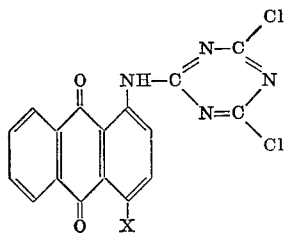

wherein X has the same meaning as above, with β-methoxy- or β-ethoxy-ethanol at 40–130° C. in the presence of an acid-binding agent, for example the sodium derivative of β-methoxy- or β-ethoxy-ethanol.

Synthetic fibre materials which may be dyed or printed with the new dyestuffs are, in particular, linear aromatic polyesters, such as polyethylene terephthalates or polyesters from 1,4-bis-hydroxy-methyl-cyclohexane and terephthalic acid, as well as fibre materials from polyamides, polyurethanes, polyacrylonitrile or cellulose triacetate.

The dyeing or printing may be carried out in known manner. For this purpose, the dyestuffs are conveniently used in a finely-divided state. The usual carriers can be added for dyeing on polyethylene terephthalate fibres. Particularly good results are obtained with the dyestuffs according to the present invention when they are applied by the procedure known as the thermosol process.

The dyeings or prints obtained with the dyestuffs according to the present invention are characterised by an excellent fastness to light, thermofixing, washing, tubbing and ironing.

The following examples are given for the purpose of illustrating the present invention, the parts being parts by weight, unless otherwise stated:

EXAMPLE 1

(a) A fabric of polyethylene terephthalate fibre is impregnated on a foulard with a liquor which contains, per litre, 20 g. 2,4-di-β-methoxyethoxy-6-(1'-anthraquinonylamino)-1,3,5-triazine, as well as 20 g. of a thermosol adjuvant, especially a polyether. The fabric is then squeezed off until its increase in weight is 70% and dried at 80–120° C. in a spray nozzle drier or drying cabinet. The fabric is thereafter treated for about 45 seconds with hot air at 190–210° C. in a tenter or spray hot flue, then rinsed, optionally subjected to a reductive after-treatment, washed, rinsed and dried. The reductive after-treatment for the removal of dyestuff particles superfically adhering to the fibres may be carried out by introducing the fabric at 25° C. into a liquor containing 3–5 cc./litre of sodium hydroxide solution (38° Bé.) and 1–2 g./litre of concentrated sodium hydrosulphite, heating to 70° C. during the course of about 15 minutes and keeping it at 70° C. for another 10 minutes. It is thereafter hot rinsed, acidified at 50° C. with 2–3 cc./litre of 85% formic acid, rinsed and dried.

A full- greenish-yellow dyeting is obtained, which is characterised by its high dyeing yield, very good structure, as well as excellent fastness properties, in particular very good fastness to thermofixing, washing, rubbing and light.

An analogous dyeing is obtained when polyester fibres from 1,4-bis-hydroxymethyl-cyclohexane and terephthalic acid are used in place of the polyethylene terephthalate fibres.

A full, greenish-yellow dyeing is obtained by a similar method when cellulose triacetate fibres are used in place of the polyethylene terephthalate fibres and the thermosol process is carried out at 215° C. or when polyamide or polyurethane fibres are used and the thermosol process is carried out at 190–215° C.

(b) A previously cleaned and thermofixed fabric of polyethylene terephthalate fibres is printed with a printing paste which consists of 40 g. of the dyestuff specified in Example 1a, 475 g. water, 465 g. crystalline gum (1:2) and 20 g. sulphonated castor oil. It is also possible to replace the crystalline gum by an alginate thickening. The printed and dried goods are passed to 190–200° C. over a high capacity tenter or through a condensation apparatus in order to fix the dyestuff. The effective duration of the treatment is 30–60 seconds. The resultant fixed print is thereafter cold rinsed, soaped at 70–80° C. for about 10 minutes with a 1–2 g./litre of an anion-active detergent, first hot rinsed, then cold rinsed and dried.

A print which is analogous to the dyeing in Example 1a is obtained and is characterised by the same excellent fastness properties.

A full, greenish-yellow print is obtained when cellulose triacetate fibres, polyamide fibres or polyurethane fibres are used in place of the polyethylene terephthalate fibres.

(c) 100 parts polyethylene terephthalate fibres in 4000 parts water are dyed for 1.5 hours at 100° C. and at pH 4.5 with 1 part of the dyestuff specified in Example 1a, in a finely-dispersed state and in the prsenece of 15 parts o-cresotinic acid methyl ester as the carrier. A full, greenish-yellow dyeing is obtained, which is characterised by good fastness to washing, thermofixing and light. A similar dyeing is obtained when dyeing is carried out for 1 hour at 125–130° C. in the absence of a carrier.

When 100 parts cellulose triacetate are dyed at 100° C. for 1 hour with 1 part of the dyestuff specified in Example 1a, in a finely-dispersed state, in 3000 parts water, a full, greenish-yellow dyeing having good fastness to washing, thermofixing and light, is again obtained.

(d) The dyestuff specified in Example 1a may be prepared as follows: A solution of 6 parts sodium in 200 parts β-methoxy-ethanol is treated at 20–25° C. with 45 parts 2,4-dichloro-6-(1'-anthraquinonyl-amino)-1,3,5-triazine and the reaction mixture is heated at 120–125° C. for 6 hours. After cooling, the product which has crystallised in the form of yellow prisms is filtered off with suction and washed with methanol and water. There are obtained 53.8 parts 2,4-di-β-methoxy-ethoxy-6-(1'-anthraquinonyl-amino)-1,3,5-triazine (96% of the theoretical yield) of melting point 177–178° C.

EXAMPLE 2

When a fabric of polyethylene terephthalate fibres is dyed according to Example 1a with a liquor with contains, per litre, 20 g. 2,4-di-β-methoxyethoxy-6-(4'-hydroxy-1'-anthraquinonyl-amino)-1,3,5-triazine, a full, yellowish-red dyeing is obtained which has a high dyeing yield and is characterised by a very good structure and excellent fastness to light, thermofixing, washing and ironing. Fully, yellowish-red prints or dyeings are also obtained when polyethylene terephthalate fibres are printed or dyed, respectively, with 2,4-di-β-methoxyethoxy-6-(4'-hydroxy-1'-anthraquinonyl-amino)-1,3,5-triazine according to Example 1b or Example 1c, or when polyamide, polyurethane or cellulose triacetate fibres or polyester fibre materials from 1,4-bis-hydroxymethyl-cyclohexane are used in place of the polyethylene terephthalate fibres.

The dyestuff can be prepared as follows: A solution of 6 parts sodium in 200 parts β-methoxy-ethanol is treated at 20–25° C. with 47 parts 2,4-dichloro-6-(4'-hydroxy-1'-anthraquinonyl-amino)-1,3,5-triazine and the mixture is heated at 120–125° C. for 5 hours. After cooling, the product which has crystallised in the form of orange-red prisms, is filtered off with suction and washed with methanol and water. There are obtained 53 parts 2,4-di-β-methoxyethoxy-6-(4'-hydroxy-1'-anthraquinonyl-amino)-1,3,5-triazine (93.5% of the theoretical yield) of melting point 177° C.

EXAMPLE 3

A fabric of polyethylene terephthalate fibres is dyed according to Example 1a with a liquor which contains, per litre, 20 g. 2,4-di-β-ethoxyethoxy-6-(1'-anthraquinonyl-amino)-1,3,5-triazine to give a full, greenish-yellow dyeing which, in addition to a high dyeing yield and very good structure, is characterised by excellent fastness, properties, particularly by very good fastness to thermofixing, washing, rubbing and light. Full, greenish-yellow prints or dyeings are also obtained when polyethylene terephthalate fibres are printed or dyed, respectively, with 2,4-di-β-ethoxyethoxy-6-(1'-anthraquinonyl-amino)-1,3,5-triazine according to Example 1b or Example 1c, or when polyamide, polyurethane or cellulose triacetate fibres are used in place of the polyethylene terephthalate fibres.

EXAMPLE 4

A fabric of polyethylene terephthalate fibres is dyed according to Example 1a with a liquor which contains, per litre, 20 g. 2,4-di-β-ethoxyethoxy-6-(4'-hydroxy-1'-anthraquinonyl-amino)-1,3,5-triazine. A full, yellowish-red dyeing is obtained, which is characterised by a high dyeing yield and very good structure, as well as excellent fastness to light, thermofixing, washing and ironing. Full, yellowish-red prints and dyeings are obtained by a similar method when polyethylene terephthalate fibres are printed or dyed, respectively, with the dyestuff according to Example 1b or Example 1c or when polyamide, polyurethane or cellulose triacetate fibres or polyester fibre materials from 1,4-bis-hydroxymethyl-cyclohexane are used in place of the polyethylene terephthalate fibres.

What we claim is:

1. Dyestuff of the formula:

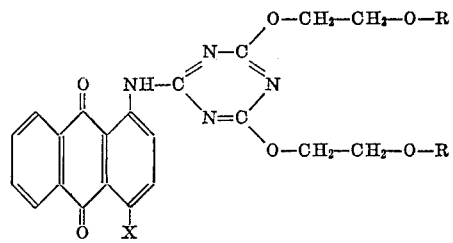

wherein X is a hydrogen atom or a hydroxyl group and R is a methyl or ethyl radial.

2. The dyestuff of the formula:

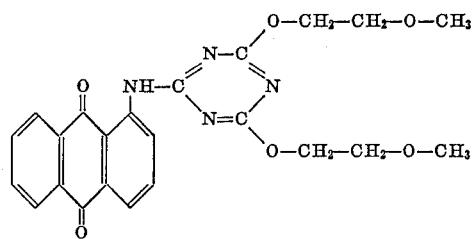

3. The dyestuff of the formula:

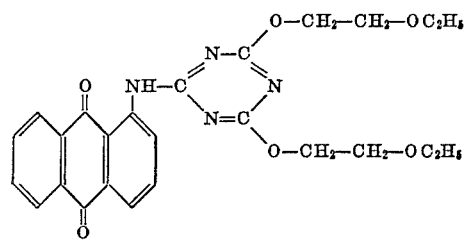

4. The dyestuff of the formula:

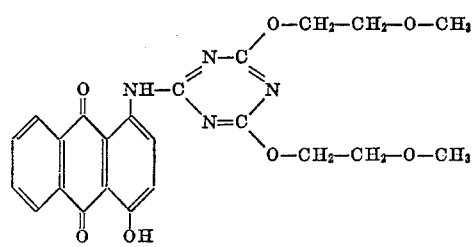

5. The dyestuff of the formula:

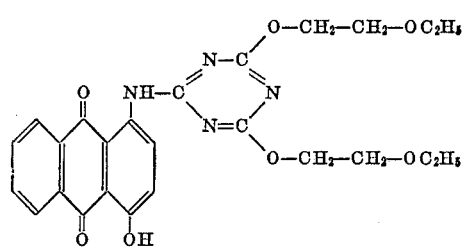

References Cited

UNITED STATES PATENTS

| | | | |
|---|---|---|---|
| 2,742,466 | 4/1956 | Randall et al. | 260—249.5 |
| 2,846,397 | 8/1958 | Ackermann | 260—249.5 XR |
| 3,156,689 | 11/1964 | Dexter et al. | 260—249.5 XR |
| 3,349,089 | 10/1967 | Kazankov et al. | 260—249 |

HENRY R. JILES, Primary Examiner

J. M. FORD, Assistant Examiner

U.S. Cl. X.R.

8—39, 40, 55